United States Patent [19]

Van Hulle

[11] 4,400,726
[45] Aug. 23, 1983

[54] TELEVISION SIGNAL DISTRIBUTION EQUIPMENT FOR A CABLE NETWORK AND INCLUDING A STABILIZER

[75] Inventor: Erick Van Hulle, Waterloo, Belgium

[73] Assignee: Societe Anonyme dite: VISIODIS, Aubervilliers, France

[21] Appl. No.: 189,883

[22] Filed: Sep. 23, 1980

[30] Foreign Application Priority Data

Jul. 18, 1980 [FR] France ................. 80 15909

[51] Int. Cl.³ .............................. H04N 7/10
[52] U.S. Cl. ...................... 358/86; 331/11; 455/3; 455/6
[58] Field of Search ........... 358/86, 195.1, 149; 455/3, 4, 5, 6, 71, 258, 261, 262, 264, 265; 331/11

[56] References Cited

U.S. PATENT DOCUMENTS

| | | | |
|---|---|---|---|
| 3,458,823 | 7/1969 | Nordahl | 331/11 |
| 3,639,840 | 2/1972 | Shekel et al. | 455/6 |

*Primary Examiner*—Joseph A. Orsino, Jr.
*Attorney, Agent, or Firm*—Sughrue, Mion, Zinn, Macpeak and Seas

[57] ABSTRACT

A TV distribution equipment includes at least one stabilizer (1) associated with a signal processing circuit (2A) suitable for transmitting TV signals to one channel of a cable TV network. The synchronizing signals in said one channel are subject to interference which may be external (e.g. received on the air from a nearly TV transmitter) or internal (e.g. intermodulation from other signal processing equipments 2B, 2C, 2D). The stabilizer (1) includes a frequency comparator (10) and a phase comparator (28) connected in parallel with their inputs arranged to receive a first signal from the associated signal processing circuit (2A) and a second signal representative of the interfering synchronizing signal. The outputs of the comparators are combined to control the frequency of a local oscillator that governs the synchronizing signals produced by the one processing circuit (2A).

13 Claims, 2 Drawing Figures

TELEVISION SIGNAL DISTRIBUTION EQUIPMENT FOR A CABLE NETWORK AND INCLUDING A STABILIZER

FIELD OF THE INVENTION

The present invention relates to television signal distribution equipment for use with a cable network, said equipment including at least one stabilizer for stabilizing the frequency and phase of the signals applied to the cablework in such a manner as to eliminate disturbance to the synchronizing signals of a given channel in the network due to interfering synchronizing signals whose origin may be internal or external to the TV signal distribution equipment as a whole.

BACKGROUND OF THE INVENTION

The TV network may be a cable TV network, a closed-circuit TV network or a community TV distribution network, e.g. in an appartment block. Such networks are conventionally provided with means for simultaneously transmitting different programs over different channels. Some of the programs may be received over the air and be applied to the network by a combination of receiver and frequency transposing equipment, while other programs may be derived from local equipment, e.g. video recorders, TV cameras, and other forms of TV signal generators that can be directly connected to cables.

Naturally it is important to have means for allocating channels to the various sources of the TV programs. Such channel-allocating means include modulators for transposing the sound and video signals to appropriate parts of the frequency spectrum. This process may include transposing the frequency of signals received on one channel for re-transmission on another.

It is convenient to refer to modulation equipment that receives IF input as a modulator, and modulation equipment that receives its HF input as a transposer. In either case, the modulation equipment requires synchronization provided by local oscillators.

It sometimes happens that interfering signals, either from internal or from external sources, are received at frequencies very close to the locally transmitted frequencies thereby interfering with said transmissions.

One known example is the interference suffered by the video synchronizing signals of one channel on the network due to signals at the same frequency F and derived from intermodulation between two frequencies within the equipment whose sum or difference happens to be equal to F.

Another known example is disturbance of the video synchronizing signals of one channel of the network due to video synchronizing signals transmitted outside the network but on the same channel within ΔF. Such a signal may be channelled to the users of the network by the network itself. This leads to moiré patterns in the pictures received by the networks users, and can also result in loss of frame or line hold.

It is not always possible to avoid such intermodulation, particularly when channel space is limited either in the cable network or on the airwaves. Further in many cases, there is no possibility of acting on the interfering transmitter which is outside the control of the network.

SUMMARY OF THE INVENTION

The present invention thus provides television signal distribution equipment having an incorporated stabilizer for use with a cable network. The equipment has at least one signal processing circuit for transmitting over a channel of the network.

In one aspect of the invention the equipment includes at least one receiver suitable for receiving an external interfering synchronization signal, and at least one stabilizer for eliminating those disturbances in the channel synchronizing signals used by the signal processing circuit that are caused by interference from the said external synchronizing signals. The stabilizer comprises a frequency comparator and a phase comparator connected in parallel, having their inputs connected in common, both to an output of the signal processing circuit producing the synchronizing signals that are subject to interference and to an output of the signal receiver receiving the interfering synchronization signals. The outputs of the comparators are connected to respective ones of the terminals of a voltage sensitive tuning component of an oscillator in the processing circuit in such a manner as to lock the synchronizing signals of the processing equipment onto the frequency of the interfering synchronizing signals.

In a second aspect similar equipment operates on internally generated interfering signals rather than those produced by an external broadcast transmitter.

DESCRIPTION OF THE PREFERRED EMBODIMENTS

Figure 1:
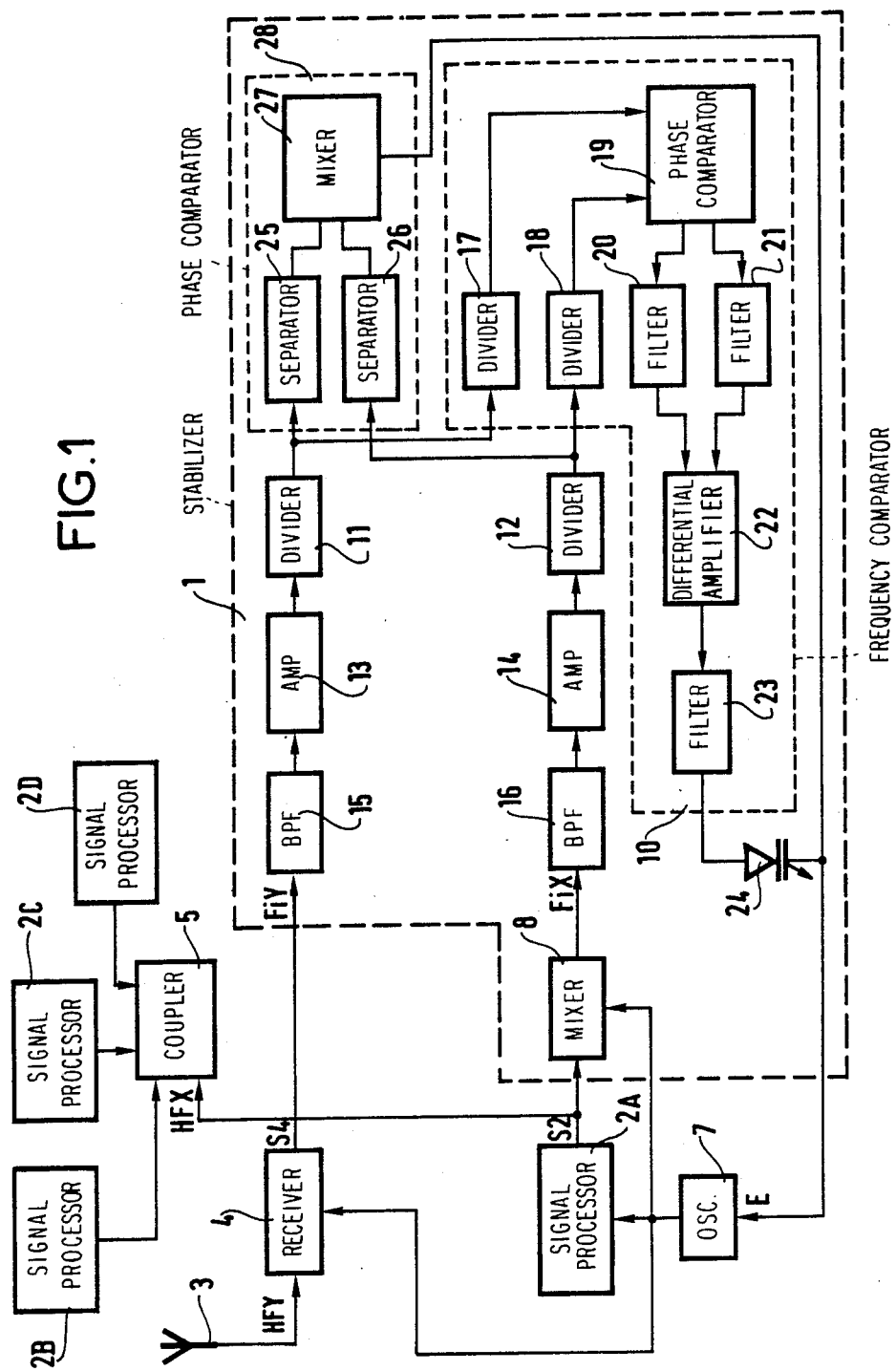
FIG. 1 is a simplified block diagram of distribution equipment having a stabilizer 1 associated with a plurality of signal processing circuits 2A,2B,2C and 2D.

Distribution equipment for a cable network comprises in conventional manner a plurality of signal processing circuits 2A, 2B, 2C and 2D capable both of receiving television programs broadcast over the air for re-transmission over the network cable after transposition to a free channel for the network, and also of producing televised messages and reproducing previously recorded programs for transmission over available network channels. Transmission to the network is performed via a distribution coupler 5.

For this purpose the signal processing circuits 2A to 2D are connected to oscillators, to enable each of them to perform the necessary frequency changes. Thus, for example, the signal processing circuit 2A receives a program broadcast over the air on a channel that is defined: by its position in the frequency spectrum, by its bandwidth, by its video bandwidth, by the separation between the video and sound carriers, etc. Then, under the control of its oscillator 7, the signal processing equipment 2A transposes the HF signals received over the air on a given channel in such a manner that the HF signals are transmitted over the cable network on a channel X and via the distribution coupler 5.

In accordance with the invention, the distribution equipment also includes a receiver 4 for receiving signals from an interfering broadcast transmitter Y in order to eliminate the disturbance created by the transmitter Y in the channel X. Such disturbances are transmitted as interference over the network cables if the present invention is not used.

The receiver 4 receives the interfering signal HFY, e.g. via an antenna 3, and it is connected to the voltage control oscillator 7 to produce intermediate frequency signals FiY from the received signals HFY.

In practice, the oscillator 7 is not normally connected to the transmitter Y whose signals are received at the receiver 4, and signals broadcast by the transmitter Y over channel X interfere with the signals produced by the signal processing equipment 2A in that channel.

Let FiX and FiY be the respective intermediate frequencies obtained from HF signals by the receiver 4 and the equipment 2A. The intermediate frequency FiY can then be written as $FiY = FiX + \Delta F + \Delta \phi$, where $\Delta F$ and $\Delta \phi$ are the frequency and phase differences respectively between the frequencies FiY and FiX. There will be no disturbance in the signals received by the users provided $\pm \Delta F \pm \Delta \phi = 0$.

In accordance with the invention the readily controlled oscillator 7 is synchronized with respect to the oscillator of the distant transmitter received by the receiver 4 by using the voltage obtained by comparing the phase and the frequency of the average intermediate frequencies extracted from the HF signals by the receiver 4 and the equipment 2A. The average intermediate frequencies FiY and FiX may be obtained from the receiver 4 and the equipment 2A by processing the corresponding HF frequencies using a conventional mixer connected to the appropriate oscillator. Thus, in FIG. 1, a mixer 8 is associated with the signal processing equipment 2A.

In accordance with the invention, the intermediate frequency signals FiY and FiX, as obtained respectively from the HF signals received by the receiver 4 and from the signal processing equipment 2A, are applied to the input of a stabilizer 1 whose output is connected to the frequency and phase controlling input E of the oscillator 7.

The stabilizer 1 comprises a frequency comparator 10 and a phase comparator 28 connected in parallel to the outputs S2 and S4 from which the intermediate frequency signals FiY and FiX are obtained from the receiver 4 and the equipment 2A. It is necessary to insert a mixer such as the mixer 8 in the connection in the event that the intermediate frequency signal FiY or FiX is not directly available from the receiver 4 and/or equipment 2A. It will be readily understood that in any given installation, it may be necessary to install a mixer such as 8 in one, both, or neither of the channels.

The intermediate frequency signals are still at a relatively high frequency. They are therefore initially applied to respective identical divider chains comprising in order: a band pass filter 15 or 16; an amplifier 13 or 14; and a divider 11 or 12. Each of the comparators 10 and 28 receives a divided-down version of each of the intermediate frequency signals.

The band pass filters 15 and 16 are narrow band filters of identical characteristics and identically-tuned to the average intermediate frequency that is to serve as the basis for comparison. They are preferably arranged so that the stabilizer has a capture range of ±700 kHz.

The amplifiers 13 and 14 are conventional selective amplifiers arranged to ensure that uniform signals are applied to the respective dividers.

The dividers 11 and 12 are conventional dividers realized in ECL technology, for example, and they divide the frequency by a sufficiently large number for at least one of the frequency and phase comparisons. Typically, they will divide by 16, thereby obtaining an output signal at a frequency about 2 MHz.

The frequency comparator 10 comprises an assembly of circuits including: two dividers 17 and 18 respectively connected to the outputs of the dividers 11 and 12; an auxiliary phase comparator 19 connected to the outputs of the dividers 17 and 18; two filters 20 and 21 having respective inputs connected to respective outputs of the auxiliary phase comparator 19; a differential amplifier 22 having its inputs connected to the respective outputs of the filters; and an output connected to the output of the differential amplifier 22 via a filter 23.

The dividers 17 and 18 are identical and they serve to reduce the frequency of the signals received from the dividers 11 and 12 sufficiently for efficient phase comparison by the auxiliary comparator 19. A typical value is division by 320.

The auxiliary comparator 19 is of conventional type, indeed a single integrated circuit package is available encapsulating the phase comparator and both dividers, and it provides two output signals as a function of the respective phase advance or lag in the signals received from the dividers. The differential amplifier 22 is conventionally constituted by an operational amplifier with its respective inputs connected to the outputs of the auxiliary comparator 19.

The filter 23 is conventional and serves to clean up the substantially DC voltage appearing at the output of the differential amplifier 22 for controlling the oscillator 7. The filtered DC is applied to one terminal of a voltage-sensitive tuning component 24. In the embodiment of FIG. 1, this component comprises a varicap diode with its cathode connected to the output of the filter 23.

The phase comparator 28 comprises two separators 25 and 26 respectively connected to the outputs of the dividers 11 and 12, together with a balanced double mixer 27 whose two inputs are connected to the respective outputs of the separators 25 and 26, and whose output is connected to the other terminal of the tuning component 24, i.e. in this case to the anode of the varicap diode 24.

The separators 25 and 26 are of conventional type and serve to clip the signals received from the dividers 11 and 12. They may, for example, be constituted by suitably biassed transistors. The balanced double mixer 27 provides, in conventional manner, a DC signal representative of the phase difference between the signals that it receives from the separators 25 and 26.

In conventional manner the voltage across the terminals of the tuning element 24, i.e. across the terminals of the varicap diode, modifies its capacitance, and therefore changes the tuning of the oscillator 7 as a function of the DC signals applied to the respective terminals of the varicap diode.

Thus the frequency and phase of the signal HFX and HFY are synchronized by means of the oscillator 7.

Thus, the distribution equipment in accordance with the invention eliminates interference signals appearing in the channel X by intermodulation of signals having frequencies whose sum or difference corresponds to a frequency FiX lying in channel X.

Figure 2:
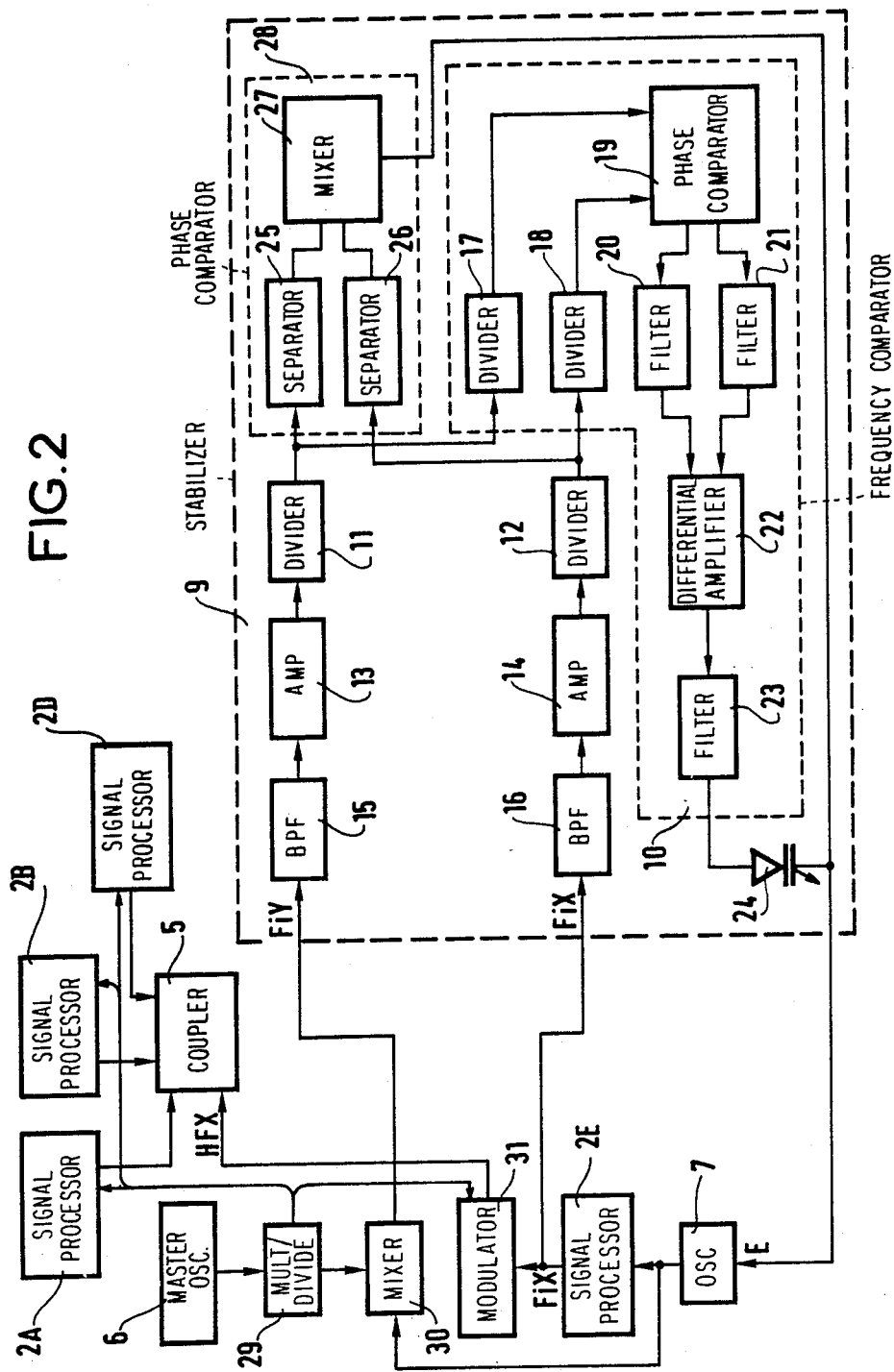
FIG. 2 shows a variation of the equipment shown in FIG. 1.

If the frequency of a master oscillator 6, FIG. 2, is multiplied or divided by an integer to obtain the frequencies required for the various apparatuses in such distribution equipment, it is possible to obtain intermodulation products in the network which have the same value in each channel as the frequency used by the distribution equipment 2A . . . 2D serving that channel. Thus, for example, if the frequency of the master oscillator 6 is Z, and n is a positive integer;

the frequency used in channel A will be $F_A = nZ$;
the frequency used in channel B will be $F_B = F_A + Z = Z(n+1)$;
the frequency used in channel C will be $F_C = F_A + 2Z = Z(n+2)$; and so on. In particular, the frequency used in channel E will be $F_E = F_A + 4Z = Z(n+4)$. Now, for example, putting $n=3$, it can be seen that the frequency $F_E$ used in channel E, i.e. $F_E = 7Z$, is identical to the frequency obtained by adding the frequencies $F_A + F_B = 3Z + 4Z = 7Z$, which corresponds to one of the intermodulation products of the generators producing the frequencies $F_A$ and $F_B$ from the signal of frequency Z of the master oscillator 6.

Consequently, to eliminate the influence of the frequency intermodulation product in the example chosen, it is sufficient to control the oscillator 7 of the processing equipment 2E (FIG. 2) by means of a stabilizer 9 in accordance with the invention which is connected to receive the intermediate frequency FiX from the processing equipment 2E, and an intermediate frequency FiY derived from the signals of the master oscillator 6.

For this purpose, signals of frequency Z from the master oscillator 6 are multiplied or divided by a unit 29 in such a manner as to produce a signal HFY whose frequency $FY = n_1 \cdot Z$ which corresponds to the frequency of an intermodulation product liable to cause interference in channel E. In the example above, $n_1 = 7$. Signals of frequency FY are then processed by a mixer 30 which also receives the signals produced by the voltage controlled oscillator 7 in such a manner as to produce intermediate frequency signals FiY for use as a reference in the comparisons using the stabilizer 9 in the same manner as in the previous case described with reference to FIG. 1.

Naturally the signal processing equipment 2E which produces synchronizations signals useful for the channel E also produces, as before, intermediate frequency signals FiX under the control of the oscillator 7. The intermediate frequency signals FiX are conventionally transmitted to a modulator 31 which derives the signals HFX therefrom for transmission to the coupler 5 for application to the cable network.

Naturally, it must be understood that if the distribution equipment includes a plurality of signal processing equipments, then it will require a plurality of stabilizers in accordance with the invention.

I claim:

1. Television signal distribution equipment for a cable network including at least one signal processing circuit (2A) suitable for transmitting signals over a channel of the network, said signal processing circuit using synchronizing signals which are subject to interference from external interfering synchronization signals:

the distribution equipment comprising at least one receiver suitable for receiving the external interfering synchronization signals, and at least one stabilizer (1) for eliminating disturbances in the synchronizing signals used by the signal processing circuit (2A) that are caused by the interference from the external synchronization signals; and wherein the stabilizer (1) comprises a frequency comparator (10) and a phase comparator (28) in parallel having inputs connected in common both (i) to an output of the signal processing circuit (2A) using the synchronizing signals which are subject to interference, and (ii) to an output of the signal receiver (4) receiving the external interfering synchronization signals, the frequency and phase comparators having their outputs connected to respective terminals of a voltage sensitive tuning component (24) associated with an oscillator (7) for the processing circuit processing circuit (2A) to the frequency of the interfering synchronization signals.

2. Television signal distribution equipment for a cable network including a plurality of signal processing circuits (2) suitable for simultaneously transmitting signals over different channels of the network, and whose respective transmission frequencies are obtained by multiplication or by division of a master oscillator frequency (6), at least one of said signal processing circuits using synchronizing signals which are subject to interference from intermodulation signals produced by other signal processing circuits of the same television signal distribution equipment due to intermodulation between signals generated by the television signal distribution equipment;

the distribution equipment comprising at least one stabilizer (9) for eliminating disturbances in the synchronizing signals of said at least one of said signal processing circuits caused by the interference from signals due to intermodulation between signals generated by the television signal distribution equipment, and at least one multiplier or divider unit (29) connected to a master oscillator for producing signals at the same frequency as the intermodulation signals; and wherein the stabilizer (9) comprises a frequency comparator (10) and a phase comparator (28) in parallel having their inputs connected in common both (i) to an output of the at least one of the signal processing circuits (2E) that uses the synchronizing signals that are subject to interference, and to an output of the multiplier or divider unit (29), the comparators (10) and (28) having their outputs connected to respective terminals of a voltage sensitive tuning component (24) associated with an oscillator (7) in the at least one of the signal processing circuits (2E).

3. Signal distribution equipment according to claims 1 or 2, wherein the signals supplied to the stabilizer are intermediate frequency signals; and wherein the frequency comparator (10) and the phase comparator (28) have their inputs connected to receive said intermediate frequencies via respective series connections comprising amplifiers (13, 14) and filters (15,16) centered on the average intermediate frequency, followed by first frequency dividers (11, 12).

4. Distribution equipment according to claim 3, wherein the frequency comparator (10) comprises:
two identical second dividers (17, 18) connected respectively to the outputs of the first dividers (11, 12);
an auxiliary phase comparator (19) connected to outputs of said second dividers (17, 18); and
a differential amplifier (22) having respective inputs connected to outputs of the auxiliary phase comparator (19) via shaping filters (20, 21) and having an output connected to one of the terminals of the tuning component (24) via a shaping filter (23).

5. Distribution equipment according to claim 4, characterized in that the phase comparator (28) comprises:
two identical separators (25,26) connected to the outputs of said first dividers (11,12) in parallel with said second dividers (17,18); and a double-balanced mixer (27) having its inputs connected to outputs of the separators (25,26) and having its output connected to the other terminal of the tuning component (24).

6. Television signal distribution equipment for a cable network including a voltage controlled oscillator for generating synchronizing signals, at least one signal processing circuit (2A) suitable for transmitting signals over a channel of the network, said signal processing circuit operating in response to the synchronizing signals generated by said voltage controlled oscillator (7), the distribution equipment comprising at least one receiver (4) receiving external interfering synchronization signals, at least one stabilizer (1) having inputs connected to receive synchronizing signals from the voltage controlled oscillator (7), transmitted signals from the signal processing circuit (2A), and the synchronization signals at an output of the signal receiver (4) for generating DC signals representative of the frequency and phase differences between the synchronizing and synchronization signals, and having an output connected to a voltage sensitive tuning component of said oscillator (7) for locking the synchronizing signals generated by said oscillator (7) to the frequency of the external interfering synchronization signals received through said receiver (4).

7. Distribution equipment according to claim 6, wherein the stabilizer comprises a frequency comparator (10) and a phase comparator (28), said frequency and phase comparators having inputs connected to receive intermediate frequencies supplied to the stabilizer via respective series connections comprising amplifiers (13, 14) and filters (15, 16) centered on the average intermediate frequency, followed by first frequency dividers (11, 12).

8. Distribution equipment according to claim 7, wherein said frequency comparator (10) comprises:
two identical second dividers (17, 18) connected respectively to the outputs of said first dividers (11, 12);
an auxiliary phase comparator (19) connected to outputs of said second dividers (17, 18); and
a differential amplifier (22) having respective inputs connected to outputs of the auxiliary phase comparator (19) and having an output connected to one of the terminals of the tuning component (24) through at least one shaping filter (20, 21, 23).

9. Distribution equipment according to claim 8, wherein said phase comparator (28) comprises:
two identical separators (25, 26) connected to the outputs of said first dividers (11, 12) in parallel with said second dividers (17, 18); and
a double-balanced mixer (27) having inputs connected to outputs of the separators (25, 26) and having an output connected to the other terminal of the tuning component (24).

10. Television signal distribution equipment for a cable network including a plurality of signal processing circuits (2A, 2B, 2C) suitable for simultaneously transmitting signals over different channels of the network, and whose respective transmission frequencies are obtained by multiplication of a master oscillator frequency, the distribution equipment comprising at least one stabilizer (9) for eliminating disturbances in the synchronizing signals of one of said signal processing circuits (2A) caused by interference from signals due to intermodulation between synchronizing signals from other signal processing circuits (2B, 2C) in said distribution equipment, at least one multiplier unit (29) for producing signals at the same frequency as the interfering intermodulation signals, the stabilizer (9) having inputs connected to receive synchronizing signals from one of said signal processing circuits (2A) and to an output of one of said multiplier units (29) for generating signals representative of the frequency and phase differences between the signals received at its inputs, and having an output connected to a voltage sensitive tuning component (24) associated with an oscillator (7) in the signal processing unit (2A) connected to said stabilizer (9) for generating said synchronizing signals of said one signal processing unit (2A).

11. Distribution equipment according to claim 10, wherein the stabilizer comprises a frequency comparator (10) and a phase comparator (28), said frequency and phase comparators having inputs connected to receive intermediate frequencies supplied to the stabilizer via respective series connections comprising amplifiers (13, 14) and filters (15, 16) centered on the average intermediate frequency, followed by first frequency dividers (11, 12).

12. Distribution equipment according to claim 11, wherein said frequency comparator (10) comprises:
two identical second dividers (17, 18) connected respectively to the outputs of said first dividers (11, 12);
an auxiliary phase comparator (19) connected to outputs of said second dividers (17, 18); and
a differential amplifier (22) having respective inputs connected to outputs of the auxiliary phase comparator (19) and having an output connected to one of the terminals of the tuning component (24) through at least one shaping filter (20, 21, 23).

13. Distribution equipment according to claim 12, wherein said phase comparator (28) comprises:
two identical separators (25, 26) connected to the outputs of said first dividers (11, 12) in parallel with said second dividers (17, 18); and
a double-balanced mixer (27) having inputs connected to outputs of the separators (25, 26) and having an output connected to the other terminal of the tuning component (24).

* * * * *